Feb. 13, 1934.  W. S. GLENNAN  1,947,042
MASSAGE DEVICE
Filed July 10, 1930
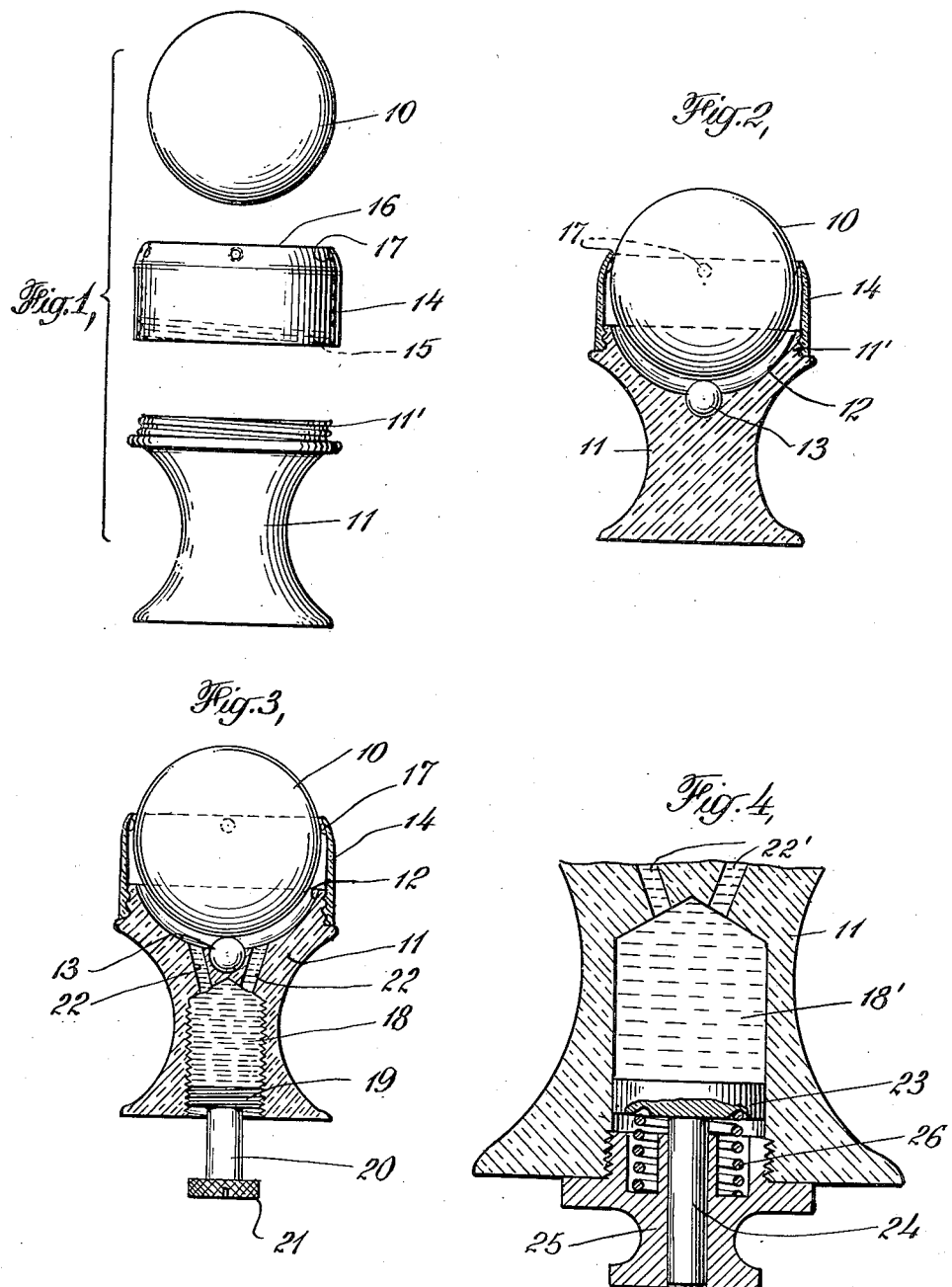

Patented Feb. 13, 1934

1,947,042

UNITED STATES PATENT OFFICE 1,947,042

MASSAGE DEVICE

William S. Glennan, Norfolk, Va.

Application July 10, 1930. Serial No. 466,961

5 Claims. (Cl. 128—57)

This invention relates to massage devices and has particular reference to a device for massaging the skin in connection with thermal treatment thereof.

Heretofore, thermal treatments of the skin involved applying either an ice pack, a lump of ice, or a hot water bag immediately to the surface of the skin to be treated, with the attendant inconvenience and disagreeable effect of the melting ice, and the disagreeable clammy feel and pore-covering action of rubber against the skin, the latter action also preventing the effective absorption by the skin of treating creams and preparations. Also, in connection with the application of massage creams in processes used heretofore, the cream was applied separately from a jar or tube and then massaged with the fingers after hot compresses had been applied to the skin, which involved messy and tedious operations not conducive to effective massaging action or comfort.

It is the principal object of this invention to eliminate these objectionable methods of massaging and heat treating the skin by providing a device which is adapted to be used for heat treating the skin without the necessity of bringing into immediate contact with the skin a piece of ice, ice pack, or hot water bag, while at the same time procuring all of the beneficial effects of each method.

Another object of the invention is to provide a massage device which, when moved over the skin, provides a firm and soft but effective rolling massage without abrading or otherwise injuring the skin.

A further object of the invention is to provide a massage device for simultaneously applying a thermal and massaging treatment to the skin, which preferably includes automatic application of a massage cream or the like, whereby the thermal treatment and massage may be effectively procured at the same time without the usual inconvenience or disagreeable effects.

These and other objects of this invention are obtained in a preferred embodiment thereof comprising a holder having a reservoir for the reception of a suitable cold cream, massage cream, or other skin treating preparation which is so arranged as to be continuously applied to the surface of the skin as the massage device is moved over it. Seated for free rotation in this holder in such a position as to continuously receive a supply of the cream from the reservoir is a metal ball having hermetically and permanently sealed therein a supply of temperature responsive material such as water, which may be cooled or frozen by placing the entire ball in a chilling medium, or which may be warmed or heated by placing the entire ball in a warming medium.

The preferred operation of the massage device consists of charging the reservoir of the holder with a supply of cream, placing the ball in hot water to heat its contents, returning the ball to its holder so that it contacts with the cream, and then massaging the skin by grasping the holder and rolling the ball over the surface thereof. The heated ball opens the pores of the skin and at the same time applies cream thereto, which is softened by the heat of the ball and applied by the rolling action. After this heat and cream applying treatment, the same or another ball is dropped into cold water or frozen, replaced in the holder, and is then again employed to massage the skin to effect a cold massage and close the pores.

For a better understanding of this invention, reference is made to the accompanying drawing, in which Fig. 1 illustrates an expanded view of the device;

Fig. 2 an assembled view of the same shown in longitudinal section;

Fig. 3 a modified form of the device having means for feeding cream therein; and Fig. 4 is an enlarged view of a modification of the same.

In the drawing, numeral 10 designates a ball which preferably consists of a hollow spherical shell of metal having a high coefficient of thermal conductivity, such as copper, silver or their alloys or the like, in which is permanently and hermetically sealed a supply of water or other material responding readily to temperature changes, and having heat and cold retentive properties. Though the water filled sphere is preferred, the ball 10 may be of any suitable material or contain any suitable material which has the properties mentioned.

The holder or handle 11 is formed of material having a low coefficient of thermal conductivity, such as celluloid or the like, and is shaped to form a convenient handle which may be grasped in one hand and readily manipulated. The upper surface of the holder 11 is dished as shown in Fig. 2 to form the cup 12, while the upper edge thereof is threaded at 11' as shown in the drawing. Mounted in the central portion of the cup 12 is the ball bearing 13, which is freely rotatable in all directions and serves as a ball bearing.

Adapted to enclose the ball 10 in the manner shown in Fig. 2, is a ferrule or ring 14 also of thermal non-conducting material such as celluloid or the like, and having threads at its lower edge 15 for engagement with the threads 11' of the holder 11. The upper edge 16 of the ring 14 is turned inwardly to embrace the ball 10 above the large diameter thereof, so that when the ball is placed in the ring 14 and the latter screwed on the holder 11, the ball will be held on the holder 11 by the inwardly turned upper edge 16 of the ring 14.

Protruding from the inner surface of the upper edge 16 of the ring 14 are a plurality of knobs 17, preferably three in number, which engage the outer surface of the ball 10 and serve as bearings over which the ball may move freely. These knobs 17 may be formed in any suitable way either by forming them integrally with the ring 14, of celluloid or the like, or by fitting the ring 14 with separate knobs 17 in any suitable way, such as by driving pins through apertures in the ring 14 from the outside or the like. The knobs 17 may be of metal if desired, without carrying away any appreciable amount of heat or cold from ball 10, as they are mounted on the non-conducting ring 14.

In assembling the device of this invention shown in Figs. 1 and 2, a ball 10 is placed in the cup 12 in which the bearing ball 13 is so arranged that the ball does not touch the sides of the cup 12, but only engages the bearing ball 13. Then the ring or ferrule 14 is placed over the ball 10 and screwed down on the holder 11, so that the ball 10 is suspended between the bearing ball 13 on holder 11, and the bearing knobs 17 on ring 14. Thus, the bearings permit the ball 10 to be rotated freely when the handle of the holder 11 is grasped, the projecting portion of the ball 10 placed against a surface, and the holder moved relatively to this surface.

In use as a massage device, the ball 10 may be employed at normal temperatures to procure a smooth rolling massage without abrading the skin, the user merely grasping the handle 11, placing the projecting portion of the ball 10 upon the surface of the skin to be massaged, and then moving the same in any suitable manner to procure the desired massaging action.

If a thermal treatment of the skin is desired, together with a simultaneous massaging action, the ball 10 is first placed in either hot or cold water, whereby the contents thereof is heated to the desired temperature. Then the ball is placed in the holder as described, and the massaging action carried on in the manner indicated. It is frequently preferred that the ball 10 be placed in hot water first, and then the skin massaged to open the pores. After the hot massage, the ball 10 is placed in cold water, and a cold massage follows the hot massage to close the pores. If desired, the ball can be placed in the crypt of a refrigerating machine or other freezing medium to congeal the water in the ball 10, whereby an ice massage is obtained without the objectionable results of messiness and water which accompany the usual ice massage.

The arrangement shown in Figs. 1 and 2 is also adapted to be used for applying facial creams. If this treatment is desired, the user first removes the ball 10 and places it in hot or warm water, and in the meantime grasps the holder 11 and scoops a portion of massaging or other cream into cup 12. Then the heated ball 10 is replaced, and it will be seen that the ball engages the mass of cream in the cup 12, and by its warmth softens the cream so that it flows more freely and continually coats the ball 10 as the latter is rolled over the surface of the skin in the manner described. As the massaging operation proceeds, the heat of the ball opens the pores of the skin and continuously supplies softened cream thereto, whereby the cream massaging and thermal treatments are carried on at the same time. After the hot cream massage, the user removes the surface cream, cools ball 10 in cold water, and uses it to apply a cold massage to the skin for the purpose of closing the pores opened by the first massaging process.

In Fig. 3 a modified form of the device is illustrated, which has the same thermal treatment ball 10, the same ring 14, and the holder 11, which resembles the holder 11 in Fig. 1 in general appearance, being of the same general shape and equipped with a cup 12 and bearing ball 13. However, the stem of the holder 11 is hollow to provide the reservoir 18, the walls of which are threaded for the reception of the threaded piston or plunger 19, having a stem 20 fitted with the knurled button or knob 21, which extends outwardly beyond the base of the holder 11, so as to be readily rotated by the user. Connecting the cup 12 with the reservoir 18 is a plurality of passages 22 extending to either side of the bearing ball 13 as shown in Fig. 3.

The device shown in Fig. 3 is used in the manner described in connection with Figs. 1 and 2, except that instead of scooping cream into the cup 12, the reservoir 18 is filled with cream or with a cartridge or stick thereof, and then plunger or piston 19 is screwed down by knob 21 to force the cream through passages 22 against the heated ball 10, which distributes it to the skin in the manner described. This device has the advantage of employing only as much cream as is desired, and having a greater supply of cream in a readily regulated quantity.

In Fig. 4 is illustrated another modified form of the device in which the cream reservoir 18 is not threaded, but is bored smoothly for the reception of the piston or plunger 23 having the stem 24 piloted in a cap 25 screwed into the outer end of the reservoir 18'. A spring 26 continually urges the piston 23 against the supply of cream in reservoir 18' to force the same through passages 22' against the surface of the ball. This arrangement differs from that shown in Fig. 3 in that the cream is supplied continuously, and it enables one instrument to be used continuously for the cream massage, while another instrument of the kind shown in Figs. 1 and 2 might be used for the cold massage or the like.

It will be seen that the device of this invention provides a very simple and effective rolling massage without in any way abrading the skin. The device is capable of use by anyone, without injury to the skin, and provides, first, a very effective rolling massage, second, a combination thermal treatment and massage, and, third, a combination thermal treatment and cream massage may be obtained.

While a preferred embodiment of the invention has been illustrated and described herein, it is to be understood that the invention is not limited thereby, but is susceptible of many variations in form and detail within its scope.

I claim:

1. In a massage device, the combination of a hollow ball containing a separate heat-responsive material, a holder therefor having a cup adjacent said ball, a supply of massaging material in engagement with said ball, and a ring on the holder enclosing the ball and removable for replenishment of the massaging material, whereby rotation of said ball over a surface supplies massaging material thereto.

2. In a massage device, the combination of a ball containing heat-responsive material, a ring for partially enclosing said ball and having screw threads on one edge, bearings adjacent the other edge of said ring for engaging the surface of said ball, a handle having screw threads for receiving said ring, a cup in said handle adjacent said ball for containing massaging material and applying it to the surface of said ball, and a bearing in the cup for engaging the surface of the ball.

3. In a massage device, the combination of a hollow metal ball, temperature retentive material permanently sealed therein, said ball being adapted to be subjected to different temperatures, a holder of thermal non-conducting material for holding said ball for rotation in all directions, and a handle on said holder.

4. In a massage device, the combination of a hollow ball, a temperature retentive material permanently sealed therein, said ball being adapted to be subjected to different temperatures, a journal holder for holding said ball for free rotational movement in all directions, and a mass of massage cream in said holder and contacting with said ball for distribution thereby as the ball is rotated, the quantity and viscosity of the cream depending upon the temperature of the material in the ball.

5. In a massage device, the combination of a hollow ball containing a separate heat responsive material, a holder therefor permitting universal movement of the ball, a cup in the holder at the base of the ball, a bearing member in the bottom of the cup engaging the base of the ball, a reservoir in the holder having a plurality of outlets into the cup adjacent the bearing member, massaging material in the reservoir, and means for forcing said massaging material through said outlets into the cup for engagement with the surface of the ball adjacent the bearing member.

WILLIAM S. GLENNAN.